3,308,098
UREA-THIOUREA FORMALDEHYDE RESINS
Joseph J. Nemes, Bridgewater Township, Somerset County, Raymond Polansky, Middlesex, and William F. Herbes, Bridgewater Township, Somerset County, N.J., assignors to American Cyanamid Company, New York, N.Y., a corporation of Maine
No Drawing. Filed Aug. 30, 1960, Ser. No. 52,787
5 Claims. (Cl. 260—70)

This invention relates to water-soluble hydrophilic potentially thermosetting resinous compositions, their process of manufacture and their use to impart durable stiff flame resistant finishes to textile materials.

More particularly, the present invention relates to thermosetting resinous compositions containing partially polymerized urea-formaldehyde condensates and thiourea-formaldehyde condensates, to their process of manufacture and to their use on nylon-containing textile materials to impart a durable stiff flame-retardant finish thereto.

Thiourea-formaldehyde resins and urea-formaldehyde resins, and particularly their methylolated derivatives, are in general well known in the art. Urea-formaldehyde condensates and thiourea-formaldehyde condensates have commonly been considered to be equivalent. While this suggested equivalence may be true insofar as some varieties or resins is concerned, it has been our experience that their methods of preparation are not fully equivalent with respect to the production of water-soluble resins. For example, when a mole of thiourea is refluxed with formaldehyde in quantities of the order of 1.33 and 2.3 moles, it has been found that the reaction mixture hydrophobes upon dilution with water after relatively short periods of time. Yet under the same conditions, urea-formaldehyde mixtures can be refluxed considerably longer and still yield partial condensates of a water-soluble or water-dilutable nature. Moreover, even when water-soluble thiourea-formaldehyde resins are obtained, they have a serious drawback in their lack of stability, especially is concentrated solutions, which is manifested by a tendency to precipitate as crystals or to hydrophobe upon dilution with water.

In order to achieve the necessary stability and water solubility of these resins, namely, urea-formaldehyde and thiourea-formaldehyde, and in particular mixtures of the same, carefully controlled intricate processes have been developed where, for the first time, suitable stable, water-soluble resinous mixtures have been prepared for use, particularly in the textile finishing industry. One such method of obtaining stable, water-soluble mixtures of these resins has been to modify compositions of the same with sodium bisulfite so as to improve their stability and water solubility. While the addition of sodium bisulfite has been found to impart satisfactory stability, these compositions which are useful to impart stiffness and flame resistance to textile materials and in particular to nylon netting, have in general suffered the deficiency that when applied and cured, dusting or flaking of the finish from the treated material is sometimes encountered. Obviously, these drawbacks have to some extent limited the success of these resins. Additionally, sodium bisulfite modified resins are difficult to cure and conditions which will effect a suitable cure in conventional periods of time often result in discoloration of the finished materials, and in particular, nylon materials, rendering such materials, particularly when they are white goods, unacceptable.

Other urea and thiourea resinous compositions prepared by intricate and specific processes, while constituting noteworthy advances in this field of endeavor, have been themselves subject to limitations, in that in order to prepare the same, relatively large excesses of free formaldehyde are necessarily employed which render such resins highly undesirable to work with, both at the manufacturing and finishing levels. Still further, many of these resinous compositions do not impart a durable, stiff finish of themselves and must be modified, as for example, by blending with other thermosetting aminoplast resins in order to achieve the desired degree of stiffness. Moreover, many of these compositions, while producing highly satisfactory flame retardancy, allow room for substantial improvement.

In addition, certain of the urea-formaldehyde and thiourea-formaldehyde resins did to a significant extent require alkylation or etherification as with monohydric alcohols such as methyl, ethyl and the like to achieve stability. Such processing increased manufacturing costs and in addition rendered such resins more difficult to cure.

Accordingly, it is an object of the present invention to provide a water-soluble hydrophilic potentially thermosetting resinous composition containing urea-formaldehyde and thiourea-formaldehyde condensates which is free of the disadvantages of the sulfonated and alkylated compositions known to the prior art.

A further object of the present invention is to provide a novel process which is simple and direct whereby the improved compositions of this invention are readily prepared.

More particularly, it is an object of this invention to provide a process for producing urea-formaldehyde and thiourea-formaldehyde compositions which, when compared with seemingly similar compositions of the prior art also known to be useful for fire retardant finishes for nylon netting, do impart excellent flame retardancy and a superior hand, i.e., giving more stiffness when stiffness is desired and yet characterized by a flexibility which enables the finisher to employ dilute applications whereby excellent flame retardancy is obtained, along with a softer hand.

A particular and important object of the present invention is to provide a process for preparing novel urea formaldehyde-thiourea formaldehyde-containing compositions which is more economical than manufacturing procedures required to produce previously available resins of this type.

A still further object of the present invention is to provide a novel urea formaldehyde-thiourea formaldehyde-containing resinous composition which when properly applied to a suitable textile base, as for example, nylon netting, and curde is free of dusting.

A still further object of the present invention is to provide a novel urea formaldehyde-thiourea formaldehyde resinous composition having good storage stability in the concentrated resin form and which, when employed in textile treating baths, as for example, application pad baths, is also characterized by good stability.

These and other objects and advantages of the present invention will become more apparent from the detailed description thereof set forth hereinbelow.

In accordance with the present specification and claims, the term "concentrated resin" and similar expressions as they are employed herein refer to compositions containing from between about 70 and 85% of resin solids and more preferably from between about 78 and 82% resin solids.

The expression "stable" as applied to the resinous compositions prepared in accordance with this invention refers to the fact that these resins in their concentrated form are free from the formation of a precipitate haze or the shedding down of floc formation when allowed to stand at 25° C. for at least two weeks' time. Additionally, the term "stable" means that resins of this invention will not hydrophobe when diluted with 10 volumes of water at 25° C. for at least two weeks.

The products of this invention are made by a "one-kettle" process whereby urea is reacted with formaldehyde under alkaline conditions followed by a partial polymerization of the methylol derivative under acidic conditions. Subsequently, thiourea and additional formaldehyde are added, the thiourea then reacted under alkaline conditions with the formaldehyde. The products are aqueous solutions or dispersions of mixtures of partially polymerized essentially dimethylol urea and essentially monomethylol thiourea and may in addition contain small amounts of free thiourea and formaldehyde.

The resin blends are prepared by reacting in aqueous medium from 1.5 to 2.4 moles of formaldehyde with 1.0 mole of urea at a pH between 7 and about 10 and at a temperature between 70° and 100° C. for 0.25 to 2.0 hours. The pH of the reaction mixture is adjusted to 4.0 to 6.0 with an acid and the reaction mixture is heated at a temperature between 70° and 100° C. until the viscosity at 25° C. of a resin solution containing between 40 and 60% solids is between 25 and 40 centipoises as determined by a Stormer viscosimeter. It is an important aspect of this invention that the intermediate urea-formaldehyde be characterized by such a viscosity if a satisfactory end product is to be prepared. The pH is adjusted to 7.2 to 9.0 with an alkali, and the resin solution is filtered and concentrated by distilling in vacuo equivalent to 28" of mercury at a temperature between 50-55° C. until the residual syrup contains at least 70% solids and preferably between about 78% and 82% solids. Between 0.2 and 0.6 mole of thiourea is added, followed by sufficient additional formaldehyde to make the total available formaldehyde equivalent to between 0.7 and 1.3 moles of formaldehyde per mole of thiourea. The reaction mixture is stirred at 20° to 70° C. for 5 to 250 minutes at pH 5.0–9.0. The reaction mixture is cooled to 30° C., and the pH is adjusted to between 7.0 and 9.5. There should be at least 70% solids in the final product.

In the preferred process, 1 mole of urea and 1.9 to 2.25 moles of formaldehyde are reacted at a temperature of 90° to 100° C. in aqueous medium and at a pH of 7.5 to 8.5 for 0.5 to 1.0 hour. The pH is adjusted to between 5.0 and 5.5, and the reaction mixture is heated at a temperature between 90° and 100° C. until the viscosity of a resin solution containing about 50 to 55% solids at 25° C. is between 32 and 38 centipoises as determined by Stormer viscosimeter. The pH is adjusted to between 8.0 and 8.5 before filtering and concentrating in vacuo to a solids content of about 80% (78–82%). Between 0.3 and 0.5 mole of thiourea is added and additional formaldehyde is introduced to give between 0.8 and 1.1 moles of formaldehyde per mole of thiourea. The reaction mixture is maintained at a temperature between 25 and 35° C. for 30 to 120 minutes at pH 7.0–8.0. If necessary, the solids are adjusted to about 80%.

While in the above description and the examples to follow hereinafter the term "formaldehyde" as employed herein is intended to include formaldehyde per se, usually employed as a formalin solution, paraformaldehyde or other formaldehyde engendering substances, such as trioxane and the like may be employed. For purposes of the present invention, formaldehyde as a formalin solution or in its more concentrated form, such as paraformaldehyde, is preferred. Paraformaldehyde as a concentrated form of formaldehyde, has the advantage in that it eliminates the requirement for the removal of substantial amounts of excess water when the final product is to be concentrated.

The alkaline catalyst employed to adjust the pH to the neutral or alkaline side during methylolation of the urea and thiourea components may be any suitable alkaline material which does not react with the reactants or the reaction product in accordance with the present invention. Suitable examples of such catalysts include sodium hydroxide, potassium hydroxide, sodium carbonate, sodium bicarbonate, triethanol amine, triethyl amine, morpholine, and the like. In accordance with the present invention, sodium hydroxide is the preferred alkaline catalyst.

The acidic catalyst employed to produce a pH below 7 in order to achieve the partial polymerization of the urea-formaldehyde components of the resinous composition of this invention may be any suitable acidic material which does not react with the reactants or the reaction product. Thus, the acid may be a mineral acid or an organic acid known to those skilled in the art. By way of illustration, the acid may be hydrochloric acid, sulfuric acid, nitric acid, formic acid, oxalic acid, tartaric acid, succinic acid and the like. Formic acid is the preferred acid in accordance with the process of this invention.

The products of this invention, as noted above, have two essential components. These are a partially polymerized dimethylol urea and a partially methylolated thiourea. The urea-formaldehyde component should contain at least 1.8 moles of combined formaldehyde, and preferably at least 1.9 moles per mole of urea. The thiourea should contain at least 0.6 mole and preferably at least 0.9 mole of combined formaldehyde per mole of thiourea used. Normally the urea-formaldehyde component will not contain more than 2.0 moles of combined formaldehyde and the thiourea component will not contain more than 1.0 moles of combined formaldehyde per mole of thiourea.

It is the principal end use of the resin of the present invention that the resinous composition so prepared, when properly applied and cured on textile materials, and in particular to nylon-containing materials, imparts a durable, stiff, non-dusting, non-flaking finish thereto which is flame resistant and does not increase the combustibility of the nylon material.

For acceptable fire retardance and stiffening of such nylon textile material, the resinous composition should contain at least 70% solids and preferably 80% solids. The resinous finish should contain from between 10% and 20% and preferably from between about 12 and 18% of thiourea calculated as free thiourea. The fire retardancy is inadequate when less than 10% of thiourea is present. However, when more than 20% of the thiourea is used, the composition does not impart satisfactory stiffening of the fabric.

For each mole of methylol urea in the final composition, there is between 0.2 and 0.6 mole and preferably between 0.3 and 0.5 mole of thiourea, methylolated and unmethylolated.

The resinous composition contains components derived from between about 60 and 80 parts and preferably 63 and 73 parts of urea and from between 40 and 20 parts, preferably 37 and 27 parts, of thiourea based on the total usage of urea plus thiourea of 100 parts.

The products of this invention are clear to slightly turbid. They are normally characterized by a viscosity of between 300 and 500 centipoises at 25° C. as determined by the Stormer viscosimeter and are hydrophilic. Further, the resins of this invention, when in a freshly prepared state or when stored at refrigerated temperatures at up to two months or more, are infinitely dilutable with water. For products of good clarity and maximum stability in the pad bath, it is necessary to react the thiourea with the formaldehyde at a pH below 9 and as low a temperature as is feasible, below 50° C. and preferably below 35° C. The final pH of the product also has a strong influence on its clarity and on the stability of the pad bath. A pH between 7 and 8 has been found to be better than a pH of between 8 and 9 for obtaining a clear product which when properly employed is stable in a pad bath. In general, products having the larger amounts of methylol thiourea show greater stability in the pad baths. Products prepared by a preferred procedure remain clear at 12° C. for more than a month and at 25° C.

for at least two weeks, and at 37° C. for at least one week.

When applied to textile materials, and in particular to nylon materials, the resin compositions of this invention impart a durable, stiff finish which is free from dusting and flaking and which is flame resistant. Curing is readily effected by employing normal procedures.

As noted, the compositions of this invention are particularly useful in the finishing of nylon materials and in particular nylon netting such as nylon Rachelle netting. Such material may be treated with the resinous compositions of this invention by applying the composition thereto by means of pad bath techniques, spraying, immersion or other suitable application techniques in amounts of from between 1 and 80% of the resin solids based on the dry weight of the nylon netting. Preferably, the amount applied is from between about 70 and about 80% solids, based on the weight of the fabric.

Thereafter, the resin finish on the nylon net is cured, as for example, for from 5 minutes at 250° F. to 5 seconds at 450° F. and preferably from 90 seconds at 290° F. to 60 seconds at 350° F. to a water-insoluble state in the presence of a latent acid curing accelerator or catalyst such as ammonium bromide, ammonium chloride, certain mixed isopropanolamine hydrochlorides and the like to provide a finish having the qualities described above. Suitable catalysts of the type referred to above and known to those skilled in the art may be employed in amounts of from between 0.5 and 1.5 to 10%, based on the weight of the resin solids and preferably in amounts of from between 0.5 and 1%.

With regard to the flame retardancy appraisals recorded in the examples and tables hereinafter, these tests are conducted by employing a simple arbitrary flammability test which is applied to a piece of treated fabric. This test consists of rolling up a 4-inch square swatch of a treated material into a relatively tight cylinder and applying a lighted match to the center of the roll while the ends are held. After the roll has burned through, the match is withdrawn and it is observed that there is no after-flaming. Upon application of the same test to a piece of the same nylon net bearing the same total add-on of other thermosetting aminoplast resins, as for example, melamine-formaldehyde resins or dimethylol ethylene urea resin, the treated fabric continues to burn after the match is withdrawn.

Textile fabrics, and in particular nylon netting, when finished in accordance with the present invention, safely meet the standards described in the Flammable Fabrics Act (P.A. 88—83rd Congress) whereas, as is noted above, similar pieces of netting, when treated with conventional thermosetting textile resins, are classifiable as fabrics subject to rapid and intense burning.

The reported values for "hand" and for "dusting" set forth in Examples 6 to 8 hereinafter are determined by an operator feeling nylon netting finished in accordance with this invention and comparing the feeling or hand of the nylon with that produced by a commercial fire retardant identified hereinafter. Dusting is a value determined by the operator observing the presence or the formation of particles of dust or flakes of resin finish when the operator has continually flexed a finished piece of nylon netting.

In order that the present invention may be more fully understood, the following examples are given primarily by way of illustration. No details or enumerations contained therein should be construed as limitations on the present invention except insofar as they appear in the appended claims. All parts and percentages are by weight unless otherwise specifically designated.

EXAMPLE 1

To a suitable reaction vessel there was charged 3325 parts (41.0 moles) of 37% aqueous formalin, 1175 parts (19.6 moles) of urea, and sufficient 10 N aqueous sodium hydroxide to give a pH of 7.9–8.2. The reaction mixture was heated to the reflux temperature over a period of 30–45 minutes, and the reflux temperature was maintained for 30 minutes. After adjusting the pH to 5.3–5.5 with 5 N aqueous formic acid, the reflux temperature was maintained until the reaction mass has a viscosity of 34–36 centipoises. The pH was then adjusted to 8.3–8.5 with 10 N aqueous sodium hydroxide, and the solution was clarified before it was concentrated in vacuo equivalent to 28" of mercury at 50–55° C. to a residual weight of about 2900 parts. The resulting syrup was essentially a clear and colorless concentrated aqueous dispersion of partially polymerized dimethylol urea which was hydrophilic and infinitely dilutable with water. The syrup contained about 80% solids and had a viscosity at 25° C. of 1000–3000 centipoises as determined on a Stormer viscosimeter and a pH of 9.2–9.6.

To the above syrup there were charged 570 parts (7.5 moles) of thiourea and 262 parts (3.23 moles) of 37% aqueous formaldehyde, and the reaction mixture was heated at 50° C. for one hour. Following cooling to 30° C., the pH was 8.4. The resulting syrup contained about 80% solids.

EXAMPLE 2

To 1430 parts of a urea-formaldehyde syrup prepared substantially as in Example 1, there were added the number of parts of thiourea and 37% aqueous formaldehyde indicated in Table I. The reaction mixture was then heated at 50° C. for 45 minutes, and the number of parts of water indicated in Table I was added. The physical properties of the resulting products are shown in Table I.

TABLE I

|  | A | B | C | D | E |
|---|---|---|---|---|---|
| Thiourea |  | 168 | 275 | 168 | 275 |
| Moles Thiourea |  | 2.2 | 3.6 | 2.2 | 3.6 |
| 37% Formalin |  | 78 | 125 | 78 | 125 |
| Moles Formaldehyde |  | .96 | 1.54 | .96 | 1.54 |
| Water |  |  |  | 235 | 250 |
| Percent Thiourea | 0 | 10.0 | 15.0 | 8.75 | 13.2 |
| Viscosity cps. (Stormer viscosimeter) | 2,520 | 965 | 665 | 186 | 110 |
| Percent Solids (Calc.) | 80 | 80 | 80 | 70 | 70 |

EXAMPLE 3

To 2860 parts of a urea-formladehyde syrup prepared substantially as in Example 1, there were added the number of parts of thiourea and 37% formaldehyde indicated in Table II. The reaction mixture was then heated at 50° C. for 45 minutes. The physical properties of the resulting products are shown in Table II.

TABLE II

|  | A | B | C | D |
|---|---|---|---|---|
| Thiourea |  | 335 | 442 | 550 |
| Moles Thiourea |  | 4.4 | 5.7 | 7.2 |
| 37% Formalin |  | 156 | 203 | 250 |
| Moles Formaldehyde |  | 1.9 | 2.5 | 3.33 |
| Percent Thiourea |  | 10.0 | 12.6 | 15.0 |
| Viscosity, cps. (Stormer viscosimeter) | 2,180 | 870 | 655 | 495 |
| Percent Solids (Calc.) | 80 | 80 | 80 | 80 |

EXAMPLE 4

A series of preparations were made using 1160 parts of a urea-formaldehyde syrup prepared substantially as in Example 1. To the syrup there were added 228 parts of thiourea (3.0 moles) and 105 parts of 37% aqueous formaldehyde (1.3 moles). The reaction mixtures were then heated at the pH and temperature and for the length of time indicated in Table III. The stability of the products at full strength and their appearance after dilution with 10 parts of water are also shown in the table.

TABLE III

| | A | B | C | D | E | F | G |
|---|---|---|---|---|---|---|---|
| Reaction Conditions: | | | | | | | |
| pH | 9 | 7.5 | 7.5 | 7.5 | 5.5 | 5.5 | 5.5. |
| Temp., °C | 50 | 50 | 50 | 30 | 50 | 30 | 30. |
| Time, hr | 1 | 4 | 0.5 | 4 | 4 | 4 | 0.5. |
| Product: | | | | | | | |
| Stability, days at 25° C | <1 | 4 | >18 | >17 | 17 | >17 | >18. |
| Appearance after 1:10 dilution | Very cloudy. | Hydro* | Hazy Clear | Clear | Hydro* | Hazy | Clear. |

*Hydrophobe.

These results show that for increased stability the reaction of thiourea with formaldehyde should be carried out at a pH near neutral and at a temperature below 50° and preferably below 35° C. and for times not longer than required for completion of the reaction, and normally times significantly less than the maximum.

EXAMPLE 5

Four preparations were made using 1160 parts of a urea-formaldehyde syrup prepared substantially as in Example 1 in each. To the syrup at pH 8.3 there were added 228 parts of thiourea (3 moles) and 105 parts (1.3 moles) of 37% aqueous formaldehyde. The pH was adjusted to 7.4 with formic acid and the reaction mixtures were stirred at 30° C. for 30 minutes. The pH of each product was adjusted with alkali or acid to the desired value, namely 7.0, 7.5, 8.0 and 9.0, respectively.

Samples of the final products were stored at temperatures of 25° and 37° C. The samples were examined from time to time to determine the length of time the products remained clear and free from cloudiness. Also, samples of the products stored at these temperatures were diluted with 10 parts of water and observed for hydrophobing.

These tests demonstrated that as the pH of the product was decreased, the length of time the product remained clear increased and the stability of the pad bath increased.

EXAMPLE 6

A treating bath containing 80% solids of the product of Example 1 and 0.64% of ammonium chloride was applied to nylon netting by a standard padding procedure using a 100% wet pick-up. The fabric was then dried and cured for one minute at 310° F. For comparison, a similar bath was prepared using a commercial fire retardant finish for nylon made of a bisulfite-modified urea-thiourea formaldehyde resin and identified as Fire Retardant X.

The treated fabrics were compared for fire retardancy, hand, color and dusting.

The results of the tests are shown in Table IV.

TABLE IV

| | Product of Example 1 | Fire Retardant X |
|---|---|---|
| Fire Retardancy | Does not burn | Does not burn. |
| Hand | Satisfactory | Satisfactory. |
| Color of treated nylon | do | Do. |
| Dusting | None | None. |

EXAMPLE 7

The products of Example 2 and Fire Retardant finish X were tested on nylon netting as described in Example 6. The results of the tests are shown in Table V.

TABLE V

| | Pad Bath Stability, Hours | Hand | Flame Retardancy |
|---|---|---|---|
| Fire Retardant X | >6 | Standard | Satisfactory. |
| Products of Example 2: | | | |
| A | <1 | Sl. firmer | Not satisfactory. |
| B | >6 | Equal | Borderline. |
| C | >6 | do | Satisfactory. |
| D | >6 | Softer | Unsatisfactory. |
| E | >6 | do | Satisfactory. |

EXAMPLE 8

The products of Example 3 and Fire Retardant finish X were tested on nylon netting as described in Example 6. The results of the tests are shown in Table VI.

TABLE VI

| | Pad Bath Stability, Hours | Hand | Flame Retardancy |
|---|---|---|---|
| Fire Retardant X | 8 | Standard | Satisfactory. |
| Products of Example 3: | | | |
| A | <1 | Firmer | Not satisfactory. |
| B | 4 | do | Borderline. |
| C | 6 | Equal | Satisfactory. |
| D | 8 | do | Do. |

While the use of the resinous composition of this invention has been described primarily in conjunction with the finishing of formed nylon fabrics and in particular nylon netting, it should be understood that fibers, yarns or fabrics of nylon alone or in blends with synthetic or natural fibers are contemplated. Such blends should contain at least 50% nylon in combination with such materials as cotton, linen, wool, regenerated cellulose, such as viscose rayon and cuprammonium rayon, cellulose acetate, acrylic fibers, polyester fibers, and the like.

Although in the above description, the resins of this invention are described as being used alone in the finishing of nylon textile material, these resins may be employed in combination with lubricants, softeners and other textile auxiliaries as well as with other textile finishing resins such as urea-formaldehyde resins, melamine-formaldehyde resin and other aminoplasts, so long as these materials do not significantly adversely affect the desirable properties normally produced by the resins of this invention.

What is claimed is:

1. A process for preparing a water-soluble resinous product, said process comprising reacting in aqueous medium relative proportions of 1 mole of urea with from 1.5 to 2.4 moles of formaldehyde at a pH of 7 to 10, and at a temperature between 70° and 100° C. for 0.25 to 2.0 hours, adjusting the pH of the reaction mixture to between 4.0 to 6.0, partially polymerizing the urea-formaldehyde condensate at temperature of 70° to 100° C. until the viscosity at 25° C. of a resin solution containing 40–60% solids is 25–40 centipoises, adjusting the pH to between 7.2 and 9.0, concentrating the reaction mixture to a solids content of at least 70%, adding between 0.2 and 0.6 mole of thiourea and reacting said thiourea in said concentrated solids and in the presence of the partially polymerized urea-formaldehyde condensate reaction mixture with 0.7 to 1.3 moles of formaldehyde per mole of thiourea at a temperature of 20° to 70° C. for 5 to 250 minutes at a pH of about 5.0–9.0.

2. A process for preparing a water-soluble resinous product which consisting of reacting in aqueous medium relative proportions of 1.0 mole of urea with from 1.9 to 2.25 moles of formaldehyde at a pH of 7.5 to 8.5, and at a temperature between 90° and 100° C. for 0.5 to 1.0 hour, adjusting the pH of the reaction mixture to between 5.0 and 5.5, partially polymerizing the urea-formaldehyde condensate at a temperature of 90° to 100° C. until the viscosity at 25° C. of a resin solution containing 50–55% resin solids is between 32 and 38 centipoises, adjusting the pH to between 8.0 and 8.5, concentrating the reaction mixture to a solids content of about 78 to 82%, adding between 0.3 and 0.5 mole of thiourea and reacting said thiourea in said concentrated solids and in the presence of the partially polymerized urea-formaldehyde condensate reaction mixture with 0.8 to 1.1 moles of formaldehyde per mole of thiourea at a temperature of 25° to 35° C. for 30 to 120 minutes at a pH of 7.0–8.0.

3. The product prepared by the process of claim 1.
4. The product prepared by the process of claim 2.
5. A process for finishing nylon fabric to impart a stiff flame retardant finish thereto, comprising applying to said fabric a composition containing from between about 50% and about 70% resin solids produced by claim 1, and then curing the finish on the fabric.

References Cited by the Examiner

UNITED STATES PATENTS

| | | | |
|---|---|---|---|
| 2,009,986 | 7/1935 | Ellis | 260—69 |
| 2,162,331 | 6/1939 | Ellis | 260—69 |
| 2,572,256 | 10/1951 | Gainer et al. | 260—69 |
| 2,669,551 | 2/1954 | Vaughan | 260—69 |
| 2,859,206 | 11/1958 | Polansky et al. | 260—70 |
| 2,881,153 | 4/1959 | Herbes et al. | 260—70 |
| 2,922,726 | 1/1960 | Moretti et al. | 117—137 |
| 2,999,847 | 9/1961 | Nemes et al. | 260—69 |

OTHER REFERENCES

Blais: Amino Resins, pp. 51–52, Reinhold Publishing Corp. (New York), 1959, TP 986 A5 B55.

WILLIAM H. SHORT, Primary Examiner.

N. G. TORCHIN, M. STERMAN, Examiners.

V. A. MORGENSTERN, A. D. RICCI, J. MARTIN,
Assistant Examiners.